US011784931B2

(12) United States Patent
Deng et al.

(10) Patent No.: US 11,784,931 B2
(45) Date of Patent: Oct. 10, 2023

(54) NETWORK BURST LOAD EVACUATION METHOD FOR EDGE SERVERS

(71) Applicants: ZHEJIANG UNIVERSITY, Zhejiang (CN); HANGZHOU ZHUJIAYI NETWORK TECHNOLOGY CO., LTD., Zhejiang (CN)

(72) Inventors: Shuiguang Deng, Hangzhou (CN); Cheng Zhang, Hangzhou (CN); Jianwei Yin, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 0 days.

(21) Appl. No.: 17/787,579

(22) PCT Filed: Sep. 15, 2021

(86) PCT No.: PCT/CN2021/118416
§ 371 (c)(1),
(2) Date: Jun. 20, 2022

(87) PCT Pub. No.: WO2022/057811
PCT Pub. Date: Mar. 24, 2022

(65) Prior Publication Data
US 2022/0417156 A1    Dec. 29, 2022

(30) Foreign Application Priority Data

Sep. 17, 2020   (CN) .......................... 202010982950.4

(51) Int. Cl.
*G06F 15/16*   (2006.01)
*H04L 47/125*   (2022.01)
(Continued)

(52) U.S. Cl.
CPC ........ *H04L 47/125* (2013.01); *H04L 41/0636* (2013.01); *H04L 47/122* (2013.01)

(58) Field of Classification Search
CPC ............ H04L 67/1008; H04L 67/1004; H04L 67/101
See application file for complete search history.

(56) References Cited

FOREIGN PATENT DOCUMENTS

| CN | 109905888 | 6/2019 |
| CN | 110662238 | 1/2020 |

(Continued)

OTHER PUBLICATIONS

J. Xie, Y. Jia, Z. Chen, Z. Nan and L. Liang, "Efficient task completion for parallel offloading in vehicular fog computing," in China Communications, vol. 16, No. 11, pp. 42-55, Nov. 2019 (Year: 2019).*

(Continued)

*Primary Examiner* — Oscar A Louie
*Assistant Examiner* — Messeret F Gebre
(74) *Attorney, Agent, or Firm* — Jiwen Chen; Joywin IP Law PLLC (57) ABSTRACT

The present invention discloses a network burst load evacuation method for edge servers, which takes a time and average penalty function of all tasks performed by the edge system as a minimum optimization goal. This method not only takes into account the fairness of all users in the system, but also ensures that the unloading tasks of all users in the system can be completed in a relatively shortest time, and a new quantitative measure is proposed for improving user QoS response. In the implementation process of the algorithm in the present invention, a particle swarm algorithm is used to solve an optimal target of the system, This algorithm (Continued)

has a fast execution speed and high efficiency, and is especially suitable for a scene of an edge computing network system, so that when a sudden load occurs, an edge computing network system can respond in a very short time and complete the evacuation of the load, which greatly improves the fault tolerance and stability of the edge network environment.

7 Claims, 3 Drawing Sheets

(51) Int. Cl.
   *H04L 41/0631* (2022.01)
   *H04L 47/122* (2022.01)

(56) References Cited

FOREIGN PATENT DOCUMENTS

| CN | 110717300 | 1/2020 |
| CN | 111399933 | 7/2020 |
| CN | 111445111 | 7/2020 |
| CN | 111475274 | 7/2020 |
| WO | WO2020004380 | 1/2020 |

OTHER PUBLICATIONS

Rahman, A., Jin, J., Rahman, A., Cricenti, A., Afrin, M., & Yu-ning Dong. (2019). Energy-efficient optimal task offloading in cloud networked multi-robot systems. Computer Networks, 160, 11-32 (Year: 2019).*

M. Jia, J. Cao and L. Yang, "Heuristic offloading of concurrent tasks for computation-intensive applications in mobile cloud computing," 2014 IEEE Conference on Computer Communications Workshops (INFOCOM WKSHPS), Toronto, ON, Canada, 2014, pp. 352-357 (Year: 2014).*

Jia Yin et al., Task Migration and Collaborative Load Balancing Mechanism Based on Mobile Edge Computing [J]. Computer Science, 2019, 46(12): 126-131.

Yan Wang et al., Task Migration Node Selection with Trusted Service Quality in Edge Computing Environment [J/OL]. Computer Science: 1-10, Aug. 21, 2020.

* cited by examiner

NETWORK BURST LOAD EVACUATION METHOD FOR EDGE SERVERS

This is a U.S. national stage application of PCT Application No. PCT/CN2021/118416 under 35 U.S.C. 371, filed Sep. 15, 2021 in Chinese, claiming priority to Chinese Patent Applications No. 202010982950.4, filed Sep. 17, 2020, all of which are hereby incorporated by reference.

FIELD OF TECHNOLOGY

The present invention belongs to the technical field of load balancing of an edge computing network, in particular to a network burst load evacuation method for edge servers.

BACKGROUND TECHNOLOGY

In recent years, with the ever-changing and complex demands of network users, the resulting network traffic has also continued to rise. An edge computing technology is proposed to adapt to the diversification of the network demands. It meets the nearby processing of user requests, thus reducing the pressure on a cloud server in a data center, and also greatly improves the response time of the user requests; especially with the development of a series of key technologies such as an AR technology, a VR technology, and a 5G technology in recent years, a mobile Internet and an Internet of Things network urgently need a technology that reduces latency and improves the real-time nature of the user requests. The resulting edge computing network fits these characteristics. The edge computing network has its own structural and topology characteristics. How to perform load balancing of each edge server in the network and deal with the sudden burst of load is an urgent problem that needs to be considered. The load traffic of each network node is managed in a unified manner, and loads are reasonable scheduled to each edge server for execution.

The load problem in the existing edge computing network is often considered from the user's point of view. It offloads a related computing task to a nearby edge server for execution to reduce the delay of a user-side computing load task, or it performs partition of the task, wherein part is performed on a user side and the other part is performed on the edge server. This approach often does not consider the load balancing issue among edge servers in the entire network. Due to the need to consider the dependencies and constraints between all the nodes, a set of scheduling algorithms that conform to the edge computing network are designed.

Especially in an area where some mobile devices or IoT (Internet of Things) devices are located, when there is a large amount of sudden loads in a short period of time, if only the offloading on the user side is considered, the nearby edge server will face huge computing pressure, greatly increasing the response time of the user's request.

Literature [Yin Jia, Guan Xinjie, Bai Guangwei. Task Migration and Collaborative Load Balancing Mechanism Based on Mobile Edge Computing [J]. Computer Science, 2019, 46(12): 126-131.] proposes a load balancing algorithm in edge computing, which considers multiple mobile microclouds, takes a signal coverage and user location as variables, and combines a queuing theory model to give an optimal decision for each user in the system to offload, in order to process an application task request faster and more efficiently, thus solving the contradiction between energy and resources, and using an optimization algorithm to provide computing services for offloading tasks to nearby users. But the algorithm does not take into account the resource constraints of the server, and, because compared with a traditional cloud center server, memory resources and storage resources of the edge server are very limited, and a reasonable optimization algorithm for edge computing needs to consider the resource constraints of a user task.

Literature [Wang Yan, Han Xiao, Zeng Hui, Liu Jingxin, Xia Changqing. Task Migration Node Selection with Trusted Service Quality in Edge Computing Environment [J/OL]. Computer Science: 1-10, 2020-08-21] discusses the offloading of a user task in edge computing from the point of view of credibility, designs a method to relieve server load, and a voluntary balance model and resource supply and demand matching mode are proposed, but in a scenario of dynamic load change caused by a dynamic change of the credibility of a user request, it is difficult to accurately obtain the specific parameters related to the credibility, and what's more, the credibility model is also difficult to obtain.

SUMMARY OF THE INVENTION

In view of the above, the present invention proposes a network burst load evacuation method for edge servers, the purpose of which is to transfer service requests to other edge services in an edge server network where they are located for execution in the case that in an edge computing network environment, the amount of requests to the edge servers suddenly increases sharply in a short period of time in the area where mobile devices and IoT devices are located, and the edge servers in the area cannot handle these loads quickly and in time, so as to reduce the overall delay of these service requests.

A network burst or surge load evacuation method for edge servers, comprising the following steps:

(1) detecting an edge server with overloaded network tasks in a target area, and for any overloaded edge server, determining a task set $\Omega$ that the server needs to evacuate;

(2) enumerating all feasible load evacuation strategies, and for any load evacuation strategy, determining a task index of each edge server in the area after the strategy is adopted;

(3) establishing an objective function L used to evaluate the implementation effect of each load evacuation strategy as follows;

$$L = \max(a_1, a_2, \ldots, a_N) + \frac{\sum_{i=1}^{N} U_i}{N}$$

$$a_i = t^i_{mig} + t^i_{wt} + t^i_{exe}$$

$$\text{s.t.} \quad \sum_{p=1}^{N_j} v^p_{ram} \le r^j_{ram}$$

$$\sum_{p=1}^{N_j} v^p_{storage} \le r^j_{storage}$$

wherein: N is the number of tasks in the task set $\Omega$, $a_i$ is the time taken to complete the execution of an i-th task in the set $\Omega$, $U_i = c(a_i - t_d^i)$, and c is a given penalty coefficient, $t_d^i$ is a preset time limit for the completion of the i-th task in the set $\Omega$, $t_{mig}^i$ is the time consumed by the i-th task in the set $\Omega$ during a migration process, $t_{wt}^i$ is the queuing time of the i-th task in the set $\Omega$ waiting to be executed in a task queue thereof after migrating to a target server, $t_{exe}^i$ is the time consumed by the execution of the i-th task in the set $\Omega$ after migrating to the target server, $N_j$ is the number of tasks received by an j-th edge server in the target area, $r_{ram}^j$ is the amount of available memory resources of the j-th edge server in the target area, and $v_{ram}^p$ is the amount of memory resources occupied by a p-th task in the evacuation tasks received by the j-th edge server in the target area, $r_{storage}^j$ is the amount of available storage resources of the j-th edge server in the target area, and $v_{storage}^p$ is the amount of storage resources occupied by the p-th task in the evacuation tasks received by the j-th edge server in the target area;

(4) according to the above objective function L, using a hybrid particle swarm algorithm to optimize the solution to determine an optimal load evacuation strategy.

Further, each load evacuation strategy comprises a decision matrix I and an execution order matrix O, and the size of each of the two matrices is N×M, and N is the number of tasks in the task set Ω, M is the number of the edge servers in the target area, the element value $I_{ij}$ of an i-th row and a j-th column in the decision matrix I is 0 or 1, and $I_{ij}=1$ indicates that the i-th task in the set Ω is executed on the j-th edge server in the target area, otherwise $I_{ij}=0$; the element value $O_{ij}$ of the i-th row and the j-th column in the execution order matrix O is a positive integer, and specific value thereof indicates a sequence number in the evacuation task queue received by the j-th edge server in the target area for the i-th task in the set Ω, wherein the smaller the sequence number is, the earlier it is executed, and if $O_{ij}=0$, it means that the i-th task in the set Ω is not executed on the j-th edge server in the target area, both i and j are a natural number and 1≤i≤N, 1≤j≤M.

Further, the specific implementation process of the step (4) is as follows:

first, generating a particle swarm according to all feasible load evacuation strategies, wherein the scale of the particle swarm is K, and K is the number of all feasible load evacuation strategies, each particle in the particle swarm corresponds to a set of load evacuation strategies; a k-th particle in the particle swarm can be expressed as $(X_k, L_k)$, $X_k=(x_1, x_2, \ldots, x_M)$, $L_k$ is an objective function value of the load evacuation strategy corresponding to the k-th particle, $x_j$ is an evacuation task queue received by the j-th edge server in the target area, k is a natural number and 1≤k≤K; before a first round of iteration, the particle with a smallest objective function value in the current particle swarm is regarded as a global optimal particle $(X_g, L_g)$ and a local optimal particle in the first round;

then, performing multiple rounds of iterative operations, wherein for a t-th round of iteration, the specific operation process is as follows:

4.1 making each particle in the current particle swarm cross the global optimal particle once, and for the k-th particle $(X_k, L_k)$ in the particle swarm, making the particle swarm cross the global optimal particle $(X_g, L_g)$ to obtain a new particle $(X_k^1, L_k^1)$;

4.2 making the new particle obtained in step 4.1 cross with the local optimal particle $(X_k^t, C_k^t)$ in the t-th round once, and for the new particle $(X_k^1, L_k^1)$, making the new particle cross with the local optimal particle $(X_k^t, L_k^t)$ in the t-th round to obtain a new particle $(X_k^2, L_k^2)$, and t is a natural number greater than 0;

4.3 performing multiple mutations on the new particle obtained in the step 4.2, and for the new particle $(X_k^2, L_k^2)$, randomly selecting a mutation scheme from the three mutation schemes BY1~BY3 and mutating the mutation scheme multiple times to obtain a new particle $(X_k^3, L_k^3)$;

4.4 if it is judged that $L_k^3 - L_k <$e, replacing the k-th particle $(X_k, L_k)$ in the current particle swarm with the new particle $(X_k^3, L_k^3)$; if $L_k^3 < L_k^t$, taking the new particle $(X_k^3, L_k^3)$ as a t+1-th round local optimal particle $(X_k^{t+1}, L_k^{t+1})$, otherwise making the t-th round local optimal particle $(X_k^t, L_k^t)$ as the t+1-th round local optimal particle $(X_k^{t+1}, L_k^{t+1})$;

4.5 updating the global optimal particle $(X_g, L_g)$, that is, making the particle with the smallest objective function value in the current particle swarm as the global optimal particle $(X_g, L_g)$, thus completing the current iteration;

finally, after completing multiple rounds of iterations, outputting the global optimal particle $(X_g, L_g)$ as the optimal load evacuation strategy.

Further, the specific implementation mode that two particles are crossed is as follows: first randomly selecting a particle $(X_q, L_q)$ from the two particles, $X_q=(x_1, x_2, \ldots, x_M)$, $L_q$ being an objective function value of the load evacuation strategy corresponding to the particle; for the particle $(X_q, L_q)$, randomly selecting N/2 tasks from an evacuation task queue $x_1$~$x_M$ thereof, so that these tasks continue to be in an original evacuation task queue and the execution order remains unchanged; for the remaining N/2 tasks, adjusting the load evacuation policy corresponding to the particle $(X_q, L_q)$, so that the evacuation task queues in the two particles and the execution order in the queues of these tasks are consistent, thus obtaining new particles.

Further, the specific implementation mode of the variation scheme BY1 is as follows: for a certain particle $(X_q, L_q)$, $X_q=(x_1, x_2, \ldots, x_M)$, $L_q$ is the objective function value of the load evacuation strategy corresponding to the particle, randomly selecting an evacuation task queue from evacuation task queue $x_1$~$x_M$ thereof, and then randomly selecting two tasks from the queue to exchange positions.

Further, the specific implementation mode of the variation scheme BY2 is as follows: for a certain particle $(X_q, L_q)$, $X_q=(x_1, x_2, \ldots, x_M)$, $L_q$ is the objective function value of the load evacuation strategy corresponding to the particle, randomly selecting two evacuation task queues from evacuation task queue $x_1$~$x_M$ thereof, and then randomly selecting one task from each of the two queues to exchange positions.

Further, the specific implementation mode of the variation scheme BY3 is as follows: for a certain particle $(X_q, L_q)$, $X_q=(x_1, x_2, \ldots, x_M)$, $L_q$ is the objective function value of the load evacuation strategy corresponding to the particle, randomly selecting two evacuation task queue A and B from evacuation task queue $x_1$~$x_M$ thereof, randomly selecting a task a from the queue A, and randomly selecting a task b from the queue B, and then deleting the task a from the queue A and inserting the task a into the next position of task b in the queue B.

Further, for new particles generated after crossover and mutation operations, it is necessary to ensure that the following constraints are met:

$$\sum_{p=1}^{N_j} v_{ram}^p \le r_{ram}^j$$

$$\sum_{p=1}^{N_j} v_{storage}^p \le r_{storage}^j$$

The technology of the present invention abandons complex system parameters, and directly optimizes the network load emergency from the time that the user needs to offload the task itself, so that the system response speed is greatly improved, and this solution is easier to be integrated and implemented in the system. At the same time, on the basis of the minimum execution time of all tasks, the present invention considers a penalty function for timeout of the average task response time, which takes into account the guarantee of user service quality, and also improves the fairness of all overall users in the network and the efficiency of system performance.

The present invention creatively proposes to take a time and average penalty function of all tasks performed by the edge system as a minimum optimization goal. This method not only takes into account the fairness of all users in the system, but also ensures that the unloading tasks of all users in the system can be completed in a relatively shortest time, and a new quantitative measure is proposed for improving user QoS response. In the implementation process of the algorithm in the present invention, a particle swarm algorithm is used to solve an optimal target of the system. This algorithm has a fast execution speed and high efficiency, and is especially suitable for a scene of an edge computing network system, so that when a sudden load surge occurs, an edge computing network system can respond in very short time and complete the evacuation of the load, which greatly improves the fault tolerance and stability of the edge network environment.

DETAILED DESCRIPTION OF THE EMBODIMENTS

In order to describe the present invention more specifically, the technical solutions of the present invention will be described in detail below with reference to the accompanying drawings and specific embodiments.

Figure 1:
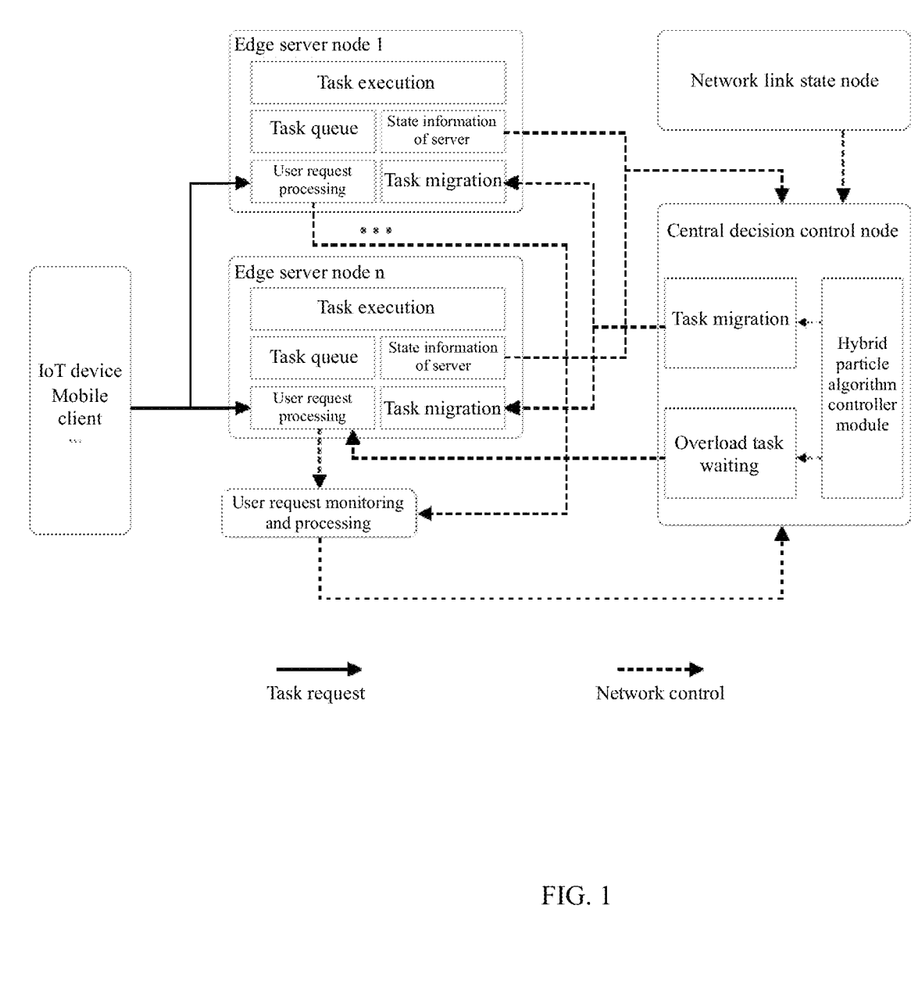
FIG. 1 is a schematic diagram of the architecture of a node load evacuation scheduling system for an edge computing network according to the present invention.

The architecture of a node load evacuation scheduling system for an edge computing network of the present invention is shown in FIG. 1, which mainly comprises two parts: an edge server node and a central controller.

Edge server response nodes: a task buffer pool is used to cache all tasks transferred from other servers to this server, wherein a task migration module controls link switching between different servers during a task migration process in the entire network, and transfers a task passing through this server to a correct link, so as to realize the migration of tasks in the network; an edge server status detection module is used to then upload the resource status of each server to a central controller; an edge server request receiving module is used to respond to requests transmitted by a user, and transmit the request information to the central controller, and monitor in real-time the occurrence of no-load emergencies in the edge servers.

Network link status nodes: collecting the load of each link in the network in real time, detecting the transmission progress of load tasks in the network, and transmitting this information to a central control node in real time as a decision basis for a central control node.

Central decision control node: by utilizing a control module based on a hybrid particle algorithm, evacuating the load according to the status and link conditions of each edge server node in the network to make a scheduling strategy.

The present invention provides corresponding load evacuation strategies for some edge servers in which load emergencies occur in the edge network, and is a decision method for migrating the load flow of a single server to the server to which it is connected to perform load balancing. First, establishing a file for each task in the load burst, and preparing for decision-making of the basic data on the edge computing network. For the i-th task, it contains three dimensions of resource requirements, $v_{cycle}^i$, $v_{ram}^i$, $v_{storage}^i$ respectively represent the number of CPU cycles required for the completion of each task, the ram resources and storage resources required for the task to execute on the edge server. Each edge server has three technical indicators: $r_{freq}^j$ represents the CPU execution rate of a j-th edge server, in cycle/slot, $r_{ram}^j$ represents the available ram resources of the j-th edge server, and $r_{storage}^j$ represents the available storage resources of the j-th edge server.

For the task transmission link between each edge server, using $L_{mm'}$ to represent the task transmission link that connects a m-th and m'-th edge servers. If $L_{mm'}=1$, it represents that there is a link connection between these two servers, otherwise, $L_{mm'}=0$ represents that there is no link between them. $L_j=[L_{j,1}, L_{j,2}, \ldots, L_{j,|M|}]$, $L_{j,j'} \in \{0,1\}$ represents the link status between the j-th edge server and all M servers in the network, $R_{j,j'}$ represents the number of tasks that can be transmitted in one time slot, and $P_{j,j'}$ represents the maximum number of transmission tasks allowed by the link in the task time slot.

The load task execution time of the edge server is calculated in the following ways $t_{exe}^i$:

$$t_{exe}^i = \frac{v_{cycle}^i}{r_{freq}^j}$$

wherein, each task of the burst load can be migrated to a different server for execution, and the total number of execution time slots of i tasks is obtained by dividing the number of CPU cycles $v_{cycle}^i$ required to complete the execution of the i-th task in the burst tasks in the edge server network by the CPU processing speed $r_{freq}^j$ of the j-th edge server where it is located.

During the execution of each task, the following constraints must be met. For each unit time slot, this task can only be executed on one edge server, and the task cannot be divided into smaller tasks in this system.

A burst of load may block on a burst-loaded edge server, and tasks are queued for the server's final response; while when a task is migrated to a server in the edge network, it is first placed in a task cache. After waiting for the tasks in the edge server to be executed, the tasks in the cache are uniformly loaded into the edge server for execution, so each task still spends part of its time waiting in the cache. For these two pieces of waiting time, the i-th task can express its waiting state by the following formula:

$$t_{wt}^i = t_{burst}^i + t_{cache}^i$$

wherein, $t_{wt}^i$ comprises two parts: the delay $t_{burst}^i$ generated by task i when a burst load occurs represents the time interval from the moment when the task i is generated on the blocked server until the moment when the task leaves the server, and the delay $t_{cache}^i$ in the server's cache queue in the transfer process of task i represents the time interval from the moment when the task i is transferred to the transferred server's cache queue until the moment when the task is started to be executed by that server.

In the edge computing network, when a sudden load event occurs on an edge server, the edge computing network system has a central decision-making function, which can quickly schedule the available server resources in the entire network and evacuate the sudden load, that is, transferring to other edge servers for load balancing. In this scheduling strategy, the process of transferring tasks from one server to another is called task migration. The purpose of the task migration is to make the delay of the final return result of the task greatly reduced. The migration time consumed by task i in the network can be obtained by the following formula:

$$t_{mig}^i = v_{size}^i / l_{jj'}$$

wherein, $v_{size}^i$ represents the data size of the task i, $l_{jj'}$ represents the task transmission rate (in bit/slot) between the overloaded server j and another edge server j' in the edge network; only one task can be transmitted per transmission, and after the task is transmitted, the link is allowed to transmit the next task.

During the migration process, each task i needs to be performed between two edge servers that already have established a transmission link. When a task is migrated, it cannot be further divided into small tasks or transmitted over multiple links. The task migration process is always continuous and uninterrupted. Once a task is successfully transferred to an edge server, it immediately enters the task cache queue of the edge server, waits until the next step for execution; one edge server can only execute one task, and the tasks are executed in the order in which they are migrated to the edge server.

Aiming at the problem of sudden load evacuation and balancing in the edge computing network environment, the present invention adopts the load evacuation and balancing method for the edge server network of the hybrid particle swarm algorithm, and combines the task transmission path in the edge server link and the server into a particle swarm. The link arrangement and server execution in the evacuation strategy are selected as a single particle in the particle swarm.

First, according to the information obtained by the calculation, the objective function of evacuating the load of the edge server network is calculated:

$$\min_{I_{ij}, S_{ij}} \left[ \max(A) + 1/N \sum_{i \in N} U_i \right]$$

$$\text{s.t.} \sum_{i \in Nj} v_{ram}^i \leq r_{ram}^j$$

$$\sum_{i \in Nj} v_{storage}^i \leq r_{storage}^j$$

where $t_{mig}^i + t_{wt}^i + t_{exe}^i = a_i$ wherein, $A = \{a_1, a_2, \ldots, a_n\}$, $i \in N$, $a_i$ is the time taken to complete the execution of the i-th task, N is the number of tasks that need to be evacuated in the overloaded server, $N_j$ represents a set of evacuation tasks received by the j-th server; $I_{ij}$ represents a decision with which the i-th task is executed on the j-th edge server, $I_{ij}=1$ represents that the task i is executed on the edge server j, otherwise $I_{ij}=0$; $S_{ij}$ represents the execution sequence number of the i-th task on the j-th edge server, $S_{ij} \in N^+$, wherein $N^+$ is a positive integer, and the task i is not executed on the edge server j, then $O_{ij}=0$; the value of $U_i$ is proportional to the difference between the completion time of executing the i-th task and the completion time limit of executing the task, defining $U_i = c(a_i - t_d^i)$, c is a penalty parameter, $t_d^i$ is a preset time limit for the completion of the task i; if the actual execution time $a_i$ of the task is greater than $t_d^i$, we consider that the execution time of the task has timed out; otherwise, the execution of the task i has been completed ahead of time; this functional function of $U_i$ calculates the quantified value of the degree of early completion or overtime completion of the task. In the process of multi-objective optimization, we hope that the mean of $U_i$ and total task evacuation time are as small as possible.

Initialization stage: generating an initial solution of the particle swarm, because each edge server has tasks to be executed, so assuming that the set of task indices on each edge server is $tskvr_m = \{1, 2, 3, 4, \ldots, N_m\}$, wherein $N_m$ represents the last task index on the m-th server, an initial solution $O_0 = \{tskvr_1, tskvr_2, \ldots, tskvr_M\}$ of a particle swarm is composed of M $tskvr_m$. Setting the number of iterations T and a threshold "e" for local solution update in an algorithm iteration process, which means that the solution obtained after cross-mutation deteriorates to a certain extent and this group of solutions are accepted.

The specific operation of the particle swarm algorithm is: firstly generating a set of feasible solutions, the number of which is D, and obtaining the optimal solution among the current feasible solutions. Its optimal solution and objective function value are $(X_g, C_g)$, wherein $X = (x_1, x_2, \ldots, x_n, \ldots, x_N)$ is this group of solutions and represents an ordered set of all task indices, and recording $(X_k, C_k)$ of all particles, assuming that $(X_k^t, C_k^t)$ is the optimal solution and objective function value in each round of iteration, initializing $(X_k^1, C_k^1) = (X_g, C_g)$.

Iterating T times for the following process:
taking t=1
Operating for D times (k=1 to D):
First, performing a cross operation between $X_k$ and $X_g$ to obtain the solution and the objective function value $(X_k^1, C_k^1)$;

Then, performing a cross operation between $X_k^1$ and $X_k^t$ to obtain the solution and the objective function value $(X_k^2, C_k^2)$;

Finally, for $(X_k^2, C_k^2)$, a random selection of a mutation scheme is performed b times to obtain the solution and the objective function value $(X_k^3, C_k^3)$.

If $C_k^3 - C_k < e$, then the solution of the current particle and the value of the objective function are updated $(X_k, C_k) = (X_k^3, C_k^3)$, otherwise $(X_k, C_k)$ is unchanged.

If $C_k^3 < C_k^t$, then $(X_k^{t+1}, C_k^{t+1}) = (X_k^3, C_k^3)$, otherwise $(X_k^{t+1}, C_k^{t+1}) = (X_k^t, C_k^t)$.

t=t+1

Taking $(X_g, C_g) = (\text{argmin}_{k \in D} C_k, C_k)$

The specific implementation method of the crossover operation is: setting the two sets of solutions as $X_1, X_2$, randomly selecting a set of solutions, assuming that the solutions are $X_1$, if N is the total number of tasks, then randomly selecting $$\left\lfloor \frac{N}{2} \right\rfloor$$

tasks in $X_1$ and the execution order in the server where they are located remains unchanged, and the remaining $$N - \left\lfloor \frac{N}{2} \right\rfloor$$

tasks correspond to the positions of the servers where the $$N - \left\lfloor \frac{N}{2} \right\rfloor$$

tasks in the solution $X_2$ are located, and the task positions in the $X_1$ are transformed to obtain a new $X_1$, which is defined as $X_0$.

Figure 2:
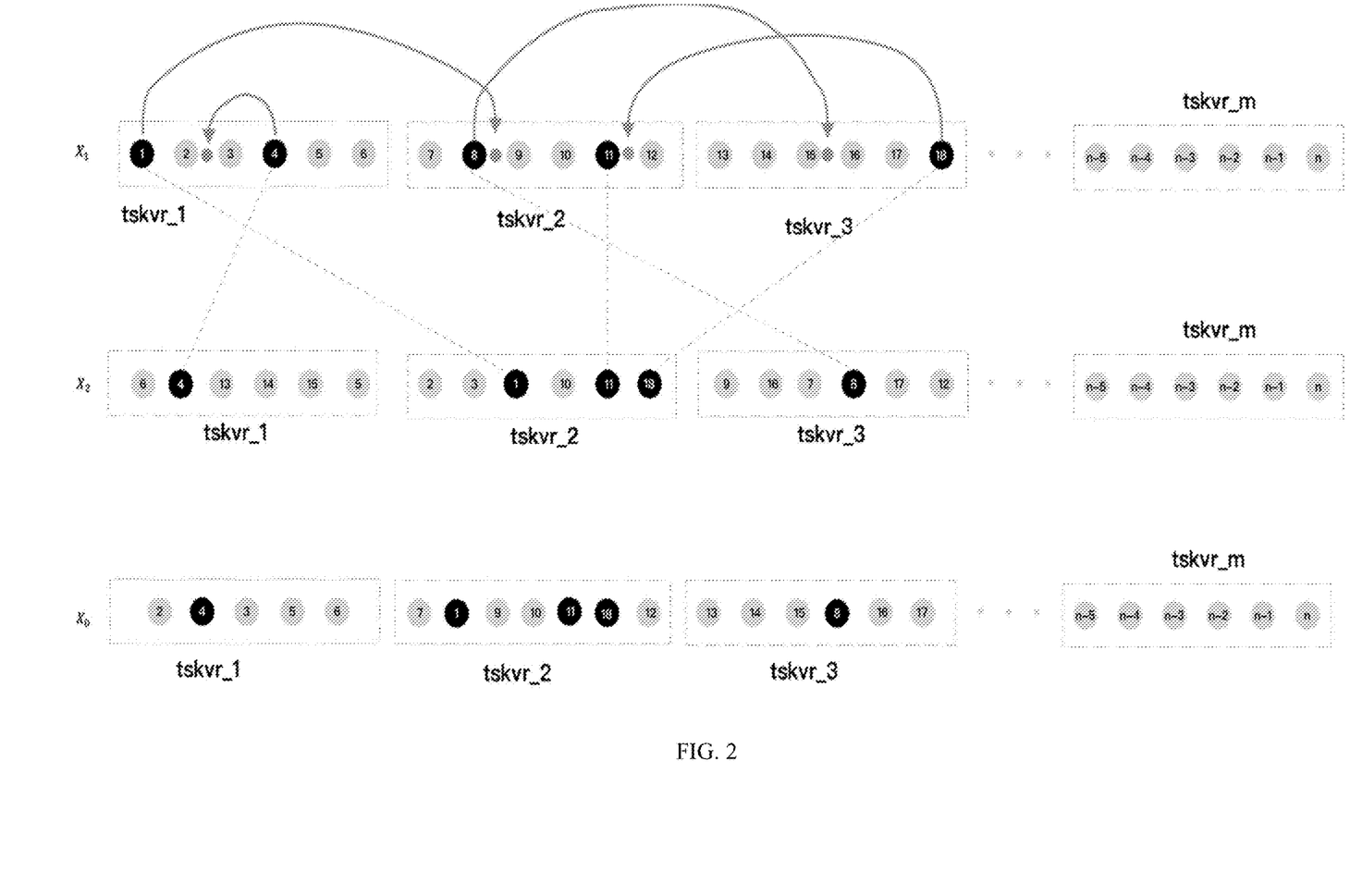
FIG. 2 is a schematic diagram of task migration for a particle crossover operation.

As shown in FIG. 2, the two groups of solutions are the black tasks in $X_1$, $X_2$ which belong to the tasks that require cross-operation, and the remaining gray tasks represent tasks that do not perform cross-operation.

If the order of task 1 in $X_2$ is 3, then first transforming task 1 to the position of the order of 3 in server 2 in $X_1$; the order of task 4 in server 1 in $X_2$ is 2, then transforming task 4 in $X_1$ to the position of the order of 2 in the server; the order of task 8 in server 3 in $X_2$ is 4, then transforming task 8 in $X_1$ to the position of the order of 4 in the server 3; remaining task 11 unchanged because the positions in the two sets of solutions are the same; the order of task 18 in server 3 in $X_2$ is 6, then transforming task 18 in $X_1$ to the position of the order of 6 in the server 3.

In the above crossover operations, the constraints must be satisfied:

$$\text{s.t.} \sum_{i \in Nj} v_{ram}^i \le r_{ram}^j$$

$$\sum_{i \in Nj} v_{storage}^i \le r_{storage}^j$$

wherein, i represents the task index, j represents the edge server index; if during the crossover process, when the task obtained from the $X_2$ is placed on the server corresponding to $X_1$, if the above relational expression is not satisfied, then the task being exchanged in $X_1$ will remain unchanged, that is, the server where the task is located remains unchanged, and the order of task in the server where the task is located remains unchanged, and then continuing to perform the crossover operation of subsequent tasks.

Figure 3:
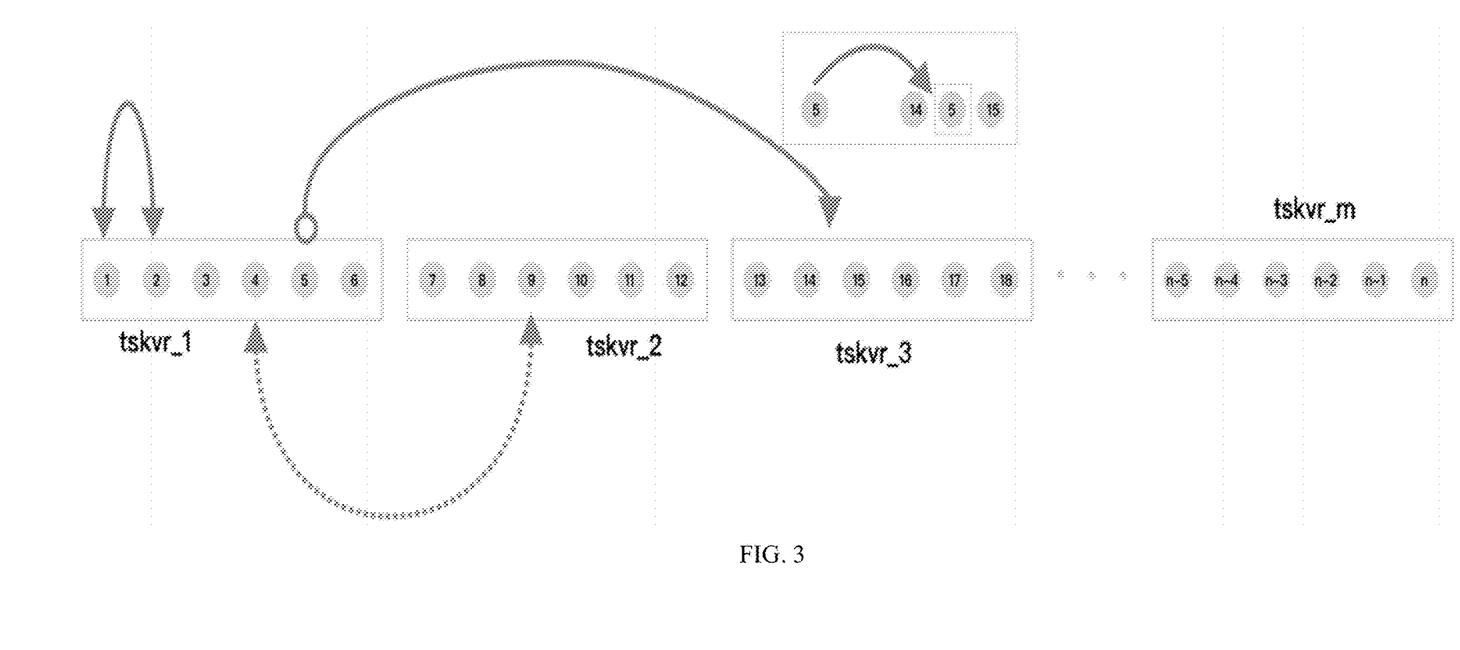
FIG. 3 is a schematic diagram of task migration for a particle mutation operation.

The specific implementation modes of the mutation operation are classified into three cases:

The first case is to randomly select a set of edge server task combinations $tskvr_k$, randomly select two of the tasks, and exchange their positions. As shown in FIG. 3, the solid line exchanges positions between task 1 and task 2.

The second case is to randomly select a task combination $tskvr_k$ and $tskvr_{k+1}$ of two different edge servers, and randomly select the two tasks in $tskvr_k$ and $tskvr_{k+1}$ to exchange positions. As shown in FIG. 3, the dotted line exchanges positions of tasks 4 and 9 in $tskvr_1$ and $tskvr_2$.

The third case is to randomly select a task combination $tskvr_k$ and $tskvr_{k+1}$ of two different edge servers, randomly select the two tasks in $tskvr_k$ and $tskvr_{k+1}$ respectively, and insert the former task into the position of the latter task. As shown in FIG. 3, the solid line with circles removes task 5 in $tskvr_1$ from the set $tskvr_i$ and then inserts it into a position after task 14 in $tskvr_3$.

In any one of the above crossover operations, the constraints must be satisfied:

$$\text{s.t.} \sum_{i \in Nj} v_{ram}^i \le r_{ram}^j$$

$$\sum_{i \in Nj} v_{storage}^i \le r_{storage}^j$$

wherein, i represents the task index, j represents the edge server index; if the above constraints are not satisfied after the mutation operation, then stopping the mutation operation, re-randomizing one of the three mutation operations, and implementing a new mutation operation until the constraints are met.

The above description of the embodiments is for the convenience of those of ordinary skill in the art to understand and apply the present invention. It will be apparent to those skilled in the art that various modifications to the above-described embodiments can be readily made, and the general principles described herein can be applied to other embodiments without inventive effort. Therefore, the present invention is not limited to the above-mentioned embodiments, and improvements and modifications made by those skilled in the art according to the disclosure of the present invention should all fall within the protection scope of the present invention.

The invention claimed is:

1. A network burst load evacuation method for edge servers, comprising the following steps:
   (1) detecting an edge server with overloaded network tasks in a target area, and for any overloaded edge server, determining a task set $\Omega$ that a server needs to evacuate;
   (2) enumerating all feasible load evacuation strategies, and for any load evacuation strategy, determining a task index of each edge server in the target area after the load evacuation strategy is adopted;
   (3) establishing an objective function L used to evaluate an implementation effect of each load evacuation strategy as follows;

$$L = \max(a_1, a_2, \ldots, a_N) + \frac{\sum_{i=1}^{N} U_i}{N}$$

$$a_i = t_{mig}^i + t_{wt}^i + t_{exe}^i$$

$$\text{s.t.} \sum_{p=1}^{Nj} v_{ram}^p \le r_{ram}^j$$

$$\sum_{p=1}^{Nj} v_{storage}^p \le r_{storage}^j$$

Wherein, N is a number of tasks in the task set $\Omega$;
$a_i$ is a time taken to complete an execution of an i-th task in the set $\Omega$;
$U_i = c(a_i - t_d^i)$, and c is a given penalty coefficient;
$t_d^i$ is a preset time limit for a completion of the i-th task in the set $\Omega$;
$t_{mig}^i$ is a time consumed by the i-th task in the set $\Omega$ during a migration process;
$t_{wt}^i$ is a queuing time of the i-th task in the set $\Omega$ for waiting to be executed in a task queue thereof after migrating to a target server;
$t_{exe}^i$ is a time consumed by the execution of the i-th task in the set $\Omega$ after migrating to the target server;
$N_j$ is a number of tasks received by a j-th edge server in the target area;
$r_{ram}^j$ is an amount of available memory resources of the j-th edge server in the target area; and
$v_{ram}^p$ is an amount of memory resources occupied by a p-th task in evacuation tasks received by the j-th edge server in the target area;
$r_{storage}^i$ is an amount of available storage resources of the j-th edge server in the target area; and
$v_{storage}^p$ is an amount of storage resources occupied by the p-th task in the evacuation tasks received by the j-th edge server in the target area;

(4) according to the above objective function L, using a hybrid particle swarm algorithm to optimize a solution to determine an optimal load evacuation strategy;

specific implementation process of the step (4) is as follows:

first, generating a particle swarm according to all feasible load evacuation strategies, wherein a scale of the particle swarm is K, and K is a number of all feasible load evacuation strategies;

each particle in the particle swarm corresponds to a set of load evacuation strategies;

a k-th particle in the particle swarm can be expressed as $(X_k, L_k)$, $X_k=(x_1, x_2, \ldots, x_M)$;

$L_k$ is an objective function value of the load evacuation strategy corresponding to the k-th particle;

$x_j$ is an evacuation task queue received by the j-th edge server in the target area;

k is a natural number and $1 \leq k \leq K$;

before a first round of iteration, the particle with a smallest objective function value in current particle swarm is regarded as a global optimal particle $(X_g, L_g)$ and a local optimal particle in the first round;

then, performing multiple rounds of iterative operations, wherein for a t-th round of iteration, a specific operation process is as follows:

(4.1) making each particle in the current particle swarm cross with the global optimal particle once, and for the k-th particle $(X_k, L_k)$ in the particle swarm, making the particle swarm cross with the global optimal particle $(X_g, L_g)$ to obtain a new particle $(X_k^1, L_k^1)$;

(4.2) making the new particle obtained in the step (4.1) cross with a local optimal particle $(X_k^t, C_k^t)$ in the t-th round once, and for the new particle $(X_k^1, L_k^1)$, making the new particle cross with the local optimal particle $(X_k^t, L_k^t)$ in the t-th round to obtain a new particle $(X_k^2, L_k^2)$, and t is a natural number greater than 0;

(4.3) performing multiple mutations on the new particle obtained in the step (4.2), and for the new particle $(X_k^2, L_k^2)$, randomly selecting a mutation scheme from three mutation schemes BY1~BY3 and mutating the mutation scheme multiple times to obtain a new particle $(X_k^3, L_k^3)$;

(4.4) if it is judged that $L_k^3 - L_k < e$, replacing the k-th particle $(X_k, L_k)$ in the current particle swarm with the new particle $(X_k^3, L_k^3)$;

if $L_k^3 < L_k^t$, taking the new particle $(X_k^3, L_k^3)$ as a (t+1)-th round local optimal particle $(X_k^{t+1}, L_k^{t+1})$, otherwise making the t-th round local optimal particle $(X_k^t, L_k^t)$ as the (t+1)-th round local optimal particle $(X_k^{t+1}, L_k^{t+1})$;

(4.5) updating the global optimal particle $(X_g, L_g)$, that is, making the particle with the smallest objective function value in the current particle swarm as the global optimal particle $(X_g, L_g)$, thus completing current iteration;

finally, after completing multiple rounds of iterations, outputting the global optimal particle $(X_g, L_g)$ as the optimal load evacuation strategy.

2. The network burst load evacuation method according to claim 1, wherein, each load evacuation strategy comprises a decision matrix I and an execution order matrix O, and a size of each of the two matrices is N×M, and N is the number of tasks in the task set $\Omega$, M is a number of the edge servers in the target area, an element value $I_{ij}$ of an i-th row and a j-th column in the decision matrix I is 0 or 1, and $I_{ij}=1$ indicates that the i-th task in the set $\Omega$ is executed on the j-th edge server in the target area, otherwise $I_{ij}=0$;

an element value $O_{ij}$ of the i-th row and the j-th column in the execution order matrix O is a positive integer; and specific value thereof indicates a sequence number in the evacuation task queue received by the j-th edge server in the target area for the i-th task in the set $\Omega$, wherein the smaller the sequence number is, the earlier it is executed; and if $O_{ij}=0$, it means that the i-th task in the set $\Omega$ is not executed on the j-th edge server in the target area, both i and j are a natural number and $1 \leq i \leq N$, $1 \leq j \leq M$.

3. The network burst load evacuation method according to claim 1, wherein, a specific implementation mode that two particles are crossed is as follows:

first randomly selecting a particle $(X_q, L_g)$ from the two particles, $X_q=(x_1, x_2, \ldots, x_M)$, $L_q$ being an objective function value of the load evacuation strategy corresponding to the particle;

for the particle $(X_q, L_g)$, randomly selecting N/2 tasks from an evacuation task queue $x_1$~$x_M$ thereof, so that these tasks continue to be in an original evacuation task queue and the execution order remains unchanged;

for the remaining N/2 tasks, adjusting the load evacuation policy corresponding to the particle $(X_q, L_q)$, so that the evacuation task queues in the two particles and the execution orders in the queues of these tasks are consistent, thus obtaining new particles.

4. The network burst load evacuation method according to claim 1, wherein, a specific implementation mode of the mutation scheme BY1 is as follows:

for a certain particle $(X_q, L_q)$, $X_q=(x_1, x_2, \ldots, x_M)$, $L_q$ is an objective function value of the load evacuation strategy corresponding to the particle, randomly selecting an evacuation task queue from evacuation task queue $x_1$~$x_M$ thereof, and then randomly selecting two tasks from the queue to exchange positions.

5. The network burst load evacuation method according to claim 1, wherein, a specific implementation mode of the mutation scheme BY2 is as follows:

for a certain particle $(X_q, L_q)$, $X_q=(x_1, x_2, \ldots, x_M)$, $L_q$ is an objective function value of the load evacuation strategy corresponding to the particle, randomly selecting two evacuation task queues from evacuation task queue $x_1$~$x_M$ thereof, and then randomly selecting one task from each of the two queues to exchange positions.

6. The network burst load evacuation method according to claim 1, wherein, the specific implementation mode of the mutation scheme BY3 is as follows:

for a certain particle $(X_q, L_g)$, $X_q=(x_1, x_2, \ldots, x_M)$, $L_q$ is an objective function value of the load evacuation strategy corresponding to the particle;

randomly selecting two evacuation task queue A and B from evacuation task queue $x_1$~$x_M$ thereof, randomly selecting a task a from the queue A, and randomly selecting a task b from the queue B, and then deleting the task a from the queue A and inserting the task a into the next position of task b in the queue B.

7. The network burst load evacuation method according to claim 1, wherein, for new particles generated after crossover and mutation operations, it is necessary to ensure that following constraints are met;

$$\sum_{p=1}^{N_j} v_{ram}^p \leq r_{ram}^j$$

$$\sum_{p=1}^{N_j} v_{storage}^p \leq r_{storage}^j.$$

* * * * *